(12) United States Patent
Ray

(10) Patent No.: US 9,094,507 B2
(45) Date of Patent: *Jul. 28, 2015

(54) SYSTEM, METHOD, AND COMPUTER PROGRAM PRODUCT FOR PROVIDING INFORMATION ASSOCIATED WITH A REMOTE GEOGRAPHIC LOCATION OF A CALLED PARTY

(71) Applicant: CenturyLink Intellectual Property LLC, Denver, CO (US)

(72) Inventor: Amar Ray, Shawnee, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,752

(22) Filed: Jan. 6, 2014

(65) Prior Publication Data

US 2014/0119523 A1 May 1, 2014

Related U.S. Application Data

(63) Continuation of application No. 12/420,218, filed on Apr. 8, 2009, now Pat. No. 8,666,043.

(51) Int. Cl.
| | |
|---|---|
| *H04M 11/00* | (2006.01) |
| *H04M 3/42* | (2006.01) |
| *H04M 1/247* | (2006.01) |
| *H04M 1/56* | (2006.01) |
| *H04M 1/2745* | (2006.01) |
| *H04M 1/725* | (2006.01) |

(52) U.S. Cl.
CPC .......... *H04M 3/42357* (2013.01); *H04M 1/247* (2013.01); *H04M 1/274558* (2013.01); *H04M 1/274566* (2013.01); *H04M 1/56* (2013.01); *H04M 1/274508* (2013.01); *H04M 1/72572* (2013.01); *H04M 2250/22* (2013.01)

(58) Field of Classification Search
USPC ................................................ 379/93.23, 45
See application file for complete search history.

(56) References Cited

U.S. PATENT DOCUMENTS

| | | | |
|---|---|---|---|
| 5,528,558 | A | 6/1996 | Mardhekar et al. |
| 5,646,986 | A | 7/1997 | Sahni et al. |
| 5,818,920 | A | 10/1998 | Rignell et al. |
| 6,330,327 | B1 | 12/2001 | Lee et al. |

(Continued)

OTHER PUBLICATIONS

U.S. Appl. No. 12/275,739; Issue Notification dated Aug. 10, 2011; 1 page.
U.S. Appl. No. 12/275,739; Non-Final Rejection dated Jan. 21, 2011; 10 pages.
U.S. Appl. No. 12/275,739; Notice of Allowance dated May 12, 2011; 10 pages.

(Continued)

*Primary Examiner* — Creighton Smith
(74) *Attorney, Agent, or Firm* — Swanson & Bratschun, L.L.C.

(57) ABSTRACT

A system, method, and computer program product for providing information local to a called party located in a different geographic location is disclosed. In one embodiment, the computer implemented method includes the steps of receiving, at the communication device, a communication identifier; sending a request to a network device to determine a current location of a second communication device associated with the communication identifier; receiving location information identifying the current location of the communication device associated with the communication identifier; and presenting at least a portion of the information corresponding to the current location of the communication device associated with the communication identifier.

19 Claims, 8 Drawing Sheets

(56) References Cited

U.S. PATENT DOCUMENTS

| | | |
|---|---|---|
| 6,985,744 B2 | 1/2006 | Katagishi et al. |
| 7,245,924 B2 | 7/2007 | Katagishi et al. |
| 7,266,558 B2 | 9/2007 | Gray |
| 7,474,744 B2 | 1/2009 | Janssen |
| 7,941,183 B2 | 5/2011 | Yomoda |
| 8,010,086 B2 | 8/2011 | Gupta |
| 8,666,043 B2 | 3/2014 | Ray |
| 2002/0168987 A1 | 11/2002 | Wang et al. |
| 2002/0168997 A1 | 11/2002 | Katagishi et al. |
| 2003/0023531 A1 | 1/2003 | Fergusson |
| 2004/0156486 A1 | 8/2004 | Gentry et al. |
| 2004/0203848 A1 | 10/2004 | Kumar |
| 2005/0070282 A1 | 3/2005 | Hinz |
| 2005/0175172 A1 | 8/2005 | Janssen |
| 2006/0286970 A1 | 12/2006 | Otobe et al. |
| 2008/0049746 A1 | 2/2008 | Morrill et al. |
| 2008/0139202 A1 | 6/2008 | Wang et al. |
| 2008/0153474 A1 | 6/2008 | Scott |
| 2008/0254773 A1 | 10/2008 | Lee |
| 2009/0016509 A1 | 1/2009 | Shah |
| 2009/0186629 A1 | 7/2009 | Soelberg et al. |
| 2010/0035585 A1 | 2/2010 | Hadinata et al. |
| 2010/0130173 A1 | 5/2010 | Gupta |
| 2010/0246787 A1* | 9/2010 | Ray .......................... 379/142.04 |
| 2010/0260327 A1 | 10/2010 | Ray |

OTHER PUBLICATIONS

U.S. Appl. No. 12/415,537; Final Rejection dated Mar. 13, 2012; 20 pages.
U.S. Appl. No. 12/415,537; Non-Final Rejection dated Oct. 7, 2011; 24 pages.
U.S. Appl. No. 12/420,218; Final Rejection dated Feb. 29, 2012; 13 pages.
U.S. Appl. No. 12/420,218; Final Rejection dated Jul. 27, 2012; 14 pages.
U.S. Appl. No. 12/420,218; Issue Notification dated Feb. 12, 2014; 1 page.
U.S. Appl. No. 12/420,218; Non-Final Rejection dated Jan. 24, 2012; 16 pages.
U.S. Appl. No. 12/420,218; Non-Final Rejection dated May 24, 2012; 19 pages.
U.S. Appl. No. 12/420,218; Notice of Allowance dated Oct. 15, 2013; 17 pages.
U.S. Appl. No. 12/415,537; Non-Final Rejection dated Jan. 29, 2015; 20 pages.
U.S. Appl. No. 12/415,537; Notice of Allowance dated Jun. 4, 2015; 23 pages.

* cited by examiner

| Name | Telephone Number | Birthday |
|---|---|---|
| Mark Smith | 617 270-1234 | 14 Jul |
| Greg Smith | 701 328-9876 | 3 Jun |
| Sharon Smith | 705 738-4567 | - |

FIG. 6

| Country | State | City | Country Code | Area Code | GMT Offset | DST Offset | Holidays | Emergency Information |
|---|---|---|---|---|---|---|---|---|
| US | MA | Boston | 1 | 617 | -5 | +1 | 1 Jan: New Year's Day; 19 Jan: Martin Luther King Day; ... | - |
| US | ND | Fargo | 1 | 701 | -6 | +1 | 1 Jan: New Year's Day; 19 Jan: Martin Luther King Day; ... | Flood |
| CA | ON | North Bay | 1 | 705 | -6 | +1 | 1 Jan: New Year's Day; 16 Feb Family Day; ... | - |

FIG. 7

SYSTEM, METHOD, AND COMPUTER PROGRAM PRODUCT FOR PROVIDING INFORMATION ASSOCIATED WITH A REMOTE GEOGRAPHIC LOCATION OF A CALLED PARTY

CROSS-REFERENCE TO RELATED APPLICATIONS

This application is a Continuation of U.S. patent application Ser. No. 12/420,218 filed on Apr. 8, 2009 entitled TELEPHONE FOR PROVIDING INFORMATION ASSOCIATED WITH A REMOTE GEOGRAPHIC LOCATION OF A CALLED PARTY TO A CALLER the entire teachings of which are incorporated herein.

BACKGROUND

The world has become a global society. People no longer simply conduct business locally, regionally, or even nationally. Today, people routinely travel and conduct business internationally. It is not uncommon for businesspeople to call many different countries and time zones throughout the business day. Similar calling situations occur for individuals if calling friends or relatives who live overseas or in different parts of the country. Because calling around the world can become a regular event for people, people often lose track of time in the time zones to which they are calling. While global society has become more of a 24/7 operation, receiving telephone calls in the middle of the night are generally unwelcomed.

In addition to people not paying attention to time zones of called parties, people are generally unaware of holidays in countries around the world. Each country has certain national holidays that "excuse" businesses to shut down for those days. For example, in Brazil, Carnaval is considered a national holiday and most businesses are closed on that date. In the United States, most businesses are closed on Labor Day, Independence Day, and Veterans Day. Callers to Brazil and the United States are generally unaware of the particular days on which these holidays fall. Telephone calls to people in those and other countries on holidays are often surprised and confused when the calls are not answered.

A situation that is more difficult to track by callers about regions around the world are emergency situations that may affect individuals, businesses, and communication services. For example, floods, hurricanes, typhoons, tornadoes, thunderstorms, blizzards, and power outages may cause businesses and telecommunications to be affected. A caller to a friend or business in a region that is being affected by a natural or manmade emergency situation may not be able to reach the friend or business. Unless the caller can reach someone else in the region or access information about the region via the Internet or news source, the caller is unable to determine why he or she cannot reach the called party.

SUMMARY

To overcome the problems of calling people in different time zones at untimely times of the day or not knowing why a called party does not answer a call due to a national or regional holiday occurring or an emergency event occurring, the principles of the present invention provide for a telephone and process that enables a caller to access information associated with remote geographic locations from the calling party. The information may include current local time of a called party, national and local holidays, and emergency situations that are currently occurring at the called party. In one embodiment, the telephone may be configured to store information associated with telephone number identifiers of telephone numbers that are stored in the telephone or that are on a recent history list of telephone numbers that have been called. As such, when the telephone numbers have a telephone number identifying, (e.g., area codes) that are associated with information stored in the telephone are deleted, the corresponding information associated with the telephone number identifiers may also be deleted, thereby preserving memory space. If a caller places a call to a called party with a telephone number having a telephone number identifier that is not currently being stored in the telephone, the telephone may access information associated with the telephone number identifier via a communications network, such as a local customer premise equipment (CPE) or server or other communications network node that is servicing the telephone.

In one embodiment, a communication device for providing information local to a called party located in a different geographic location is disclosed that comprises memory configured to store information associated with remote geographic locations, an input/output unit configured to communicate over a communications network to download the information from a network node, and a processing unit in communication with said memory and input/output unit. The processing unit is configured to execute instructions for performing operations that includes sending a request to a network device to determine a current location of a second communication device associated with an entered communication identifier, receiving location information identifying the current location of the communication device associated with the entered communication identifier, and presenting at least a portion of the information corresponding to the current location of the communication device associated with the entered communication identifier.

In another embodiment, a computer implemented method performed on a communication device for providing information local to a called party located in a different geographic location is disclosed. In one embodiment, the computer implemented method includes the steps of receiving, at the communication device, a communication identifier; sending a request to a network device to determine a current location of a second communication device associated with the communication identifier; receiving location information identifying the current location of the communication device associated with the communication identifier; and presenting at least a portion of the information corresponding to the current location of the communication device associated with the communication identifier.

BRIEF DESCRIPTION

Illustrative embodiments of the present invention are described in detail below with reference to the attached drawing figures, which are incorporated by reference herein and wherein:

FIG. 6 is a table of an illustrative contact list that may be stored in a telephone and utilized to maintain information associated with geographic locations of telephone number identifiers contained in the contact list;

FIG. 7 is a table of illustrative information associated with geographic locations associated with telephone number identifiers contained in the contact list of FIG. 6;

Figure 9:
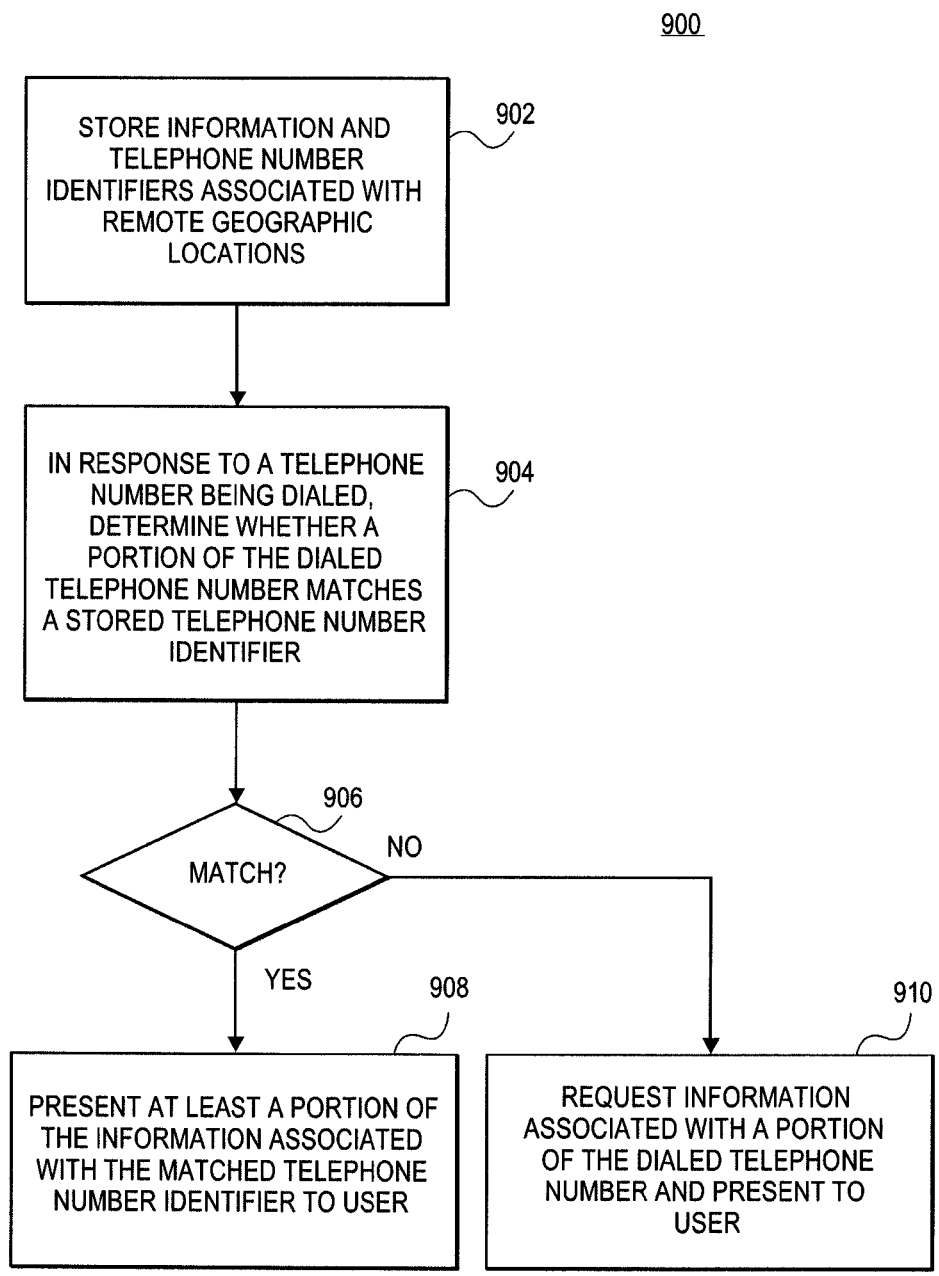
Figure 10:
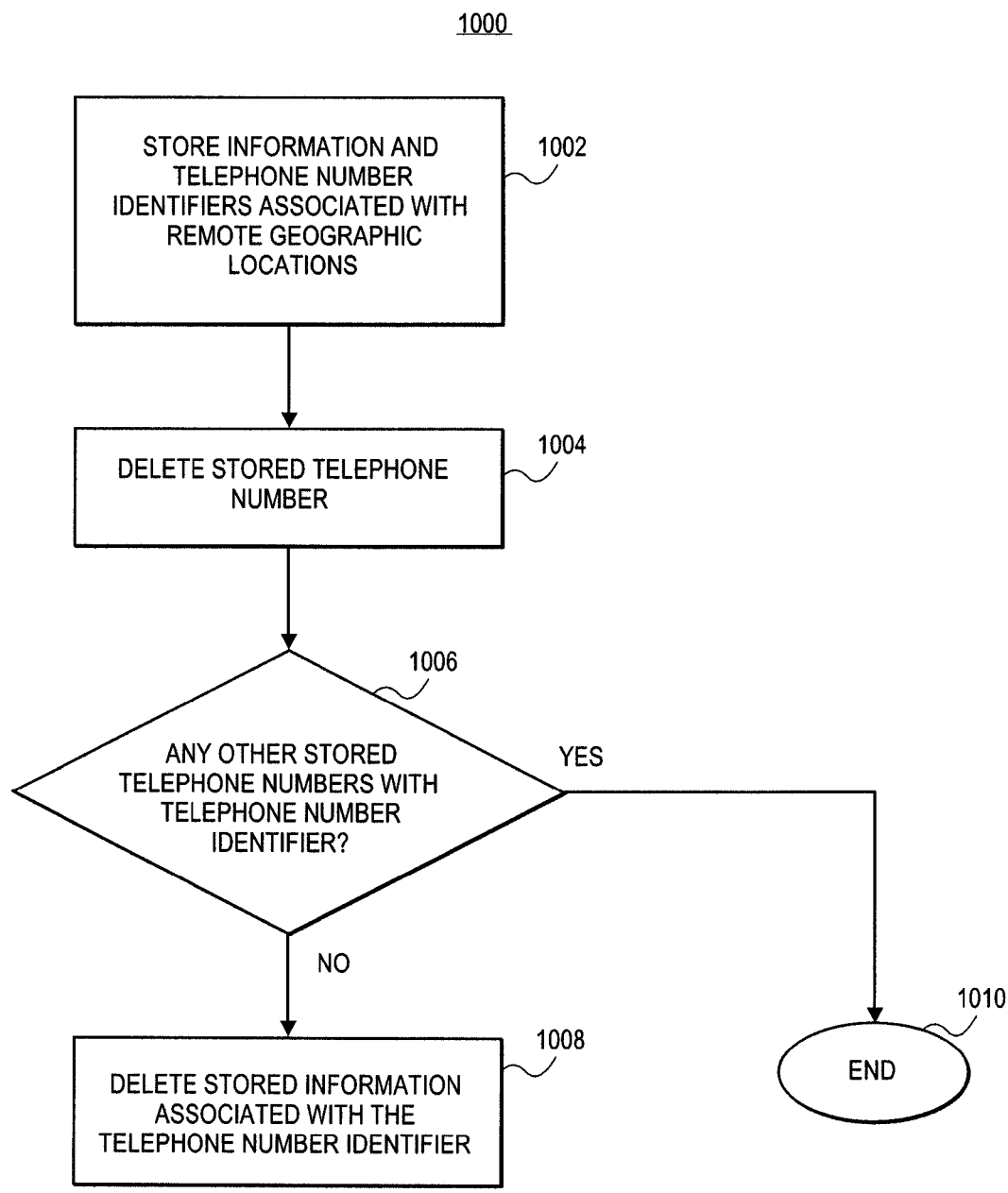

FIG. 9 is a flow diagram of an illustrative process that provides information associated with geographic locations in which telephones associated with telephone number identifiers reside and that presents the information to a user; and FIG. 10 is a flow diagram of an illustrative process for storing and managing information associated with telephone number identifiers in accordance with the principles of the present invention.

DETAILED DESCRIPTION

Figure 1:
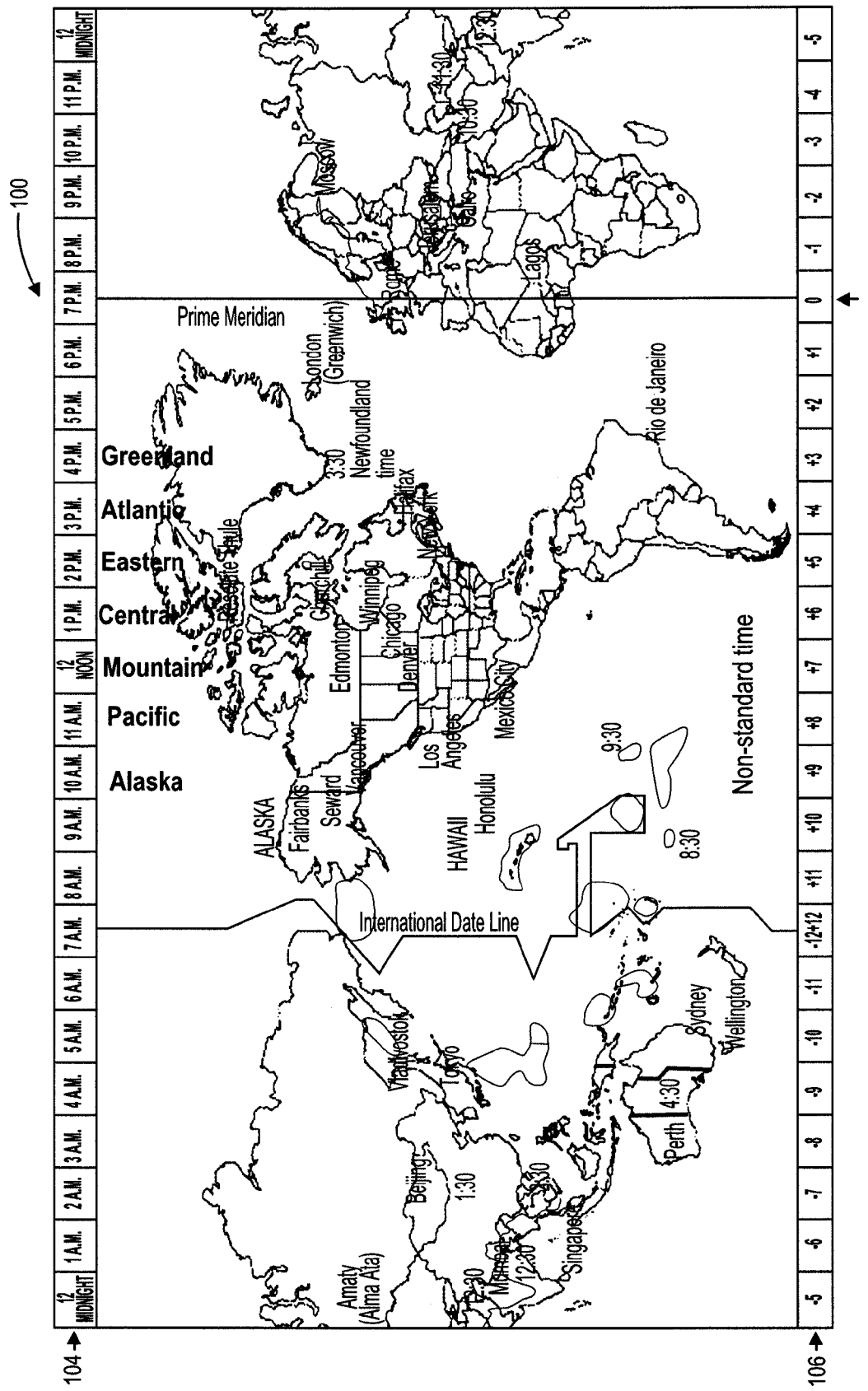
FIG. 1 is an illustration of a world map showing time zones and relative hourly differences from the Prime Meridian timeline.

With regard to FIG. 1, an illustrative map 100 showing time zones across the world is shown. As understood in the art, the Earth is divided by a Prime Meridian line 102 that passes through Greenwich, England. The rest of the world is offset in time based on distance or angle from the Prime Meridian line 102 around the globe, such that there are 24 one-hour time zones. As further understood, telecommunications are worldwide in that each country has its own country code, area codes, city codes, and/or exchange codes that enable people to call others in the same or different countries. Each of the country codes, area codes, city codes, and exchange codes are carefully managed to avoid having any telephone numbers match so as to ensure that each telephone or communications device around the world has a unique telephone number. Each country code, area code, city code, and/or exchange code may be associated with a time zone. In associating the portions of a telephone number (i.e., country code, area code, city code, and/or exchange code), an actual time 104 (e.g., 6 pm, 9 am, etc.) or differential time 106 (e.g., plus three hours, minus six hours, etc.) relative to Prime Meridian time may be associated with each of the telephone number identifiers in different respective time zones, as shown in TABLE I. As shown, each entry includes a country and state listing, country code, area/city code, exchange code, current time, GMT difference, and daylight savings time offset. It should be understood that city listings, zip codes, or any other geographic identifier may be included to further identify an area for both a user to enter information, such as holiday or emergency situation, about the associated geographic area, as further described herein.

TABLE I

| Country | State | Country Code | Area/City Code | Exch. Code | Current Time | GMT Diff | DST |
|---|---|---|---|---|---|---|---|
| US | NY | 1 | 212 | 555 | 12:42 PM | −5 | +1 |
| US | TX | 1 | 214 | 769 | 11:42 AM | −6 | +1 |
| US | CO | 1 | 303 | 274 | 10:42 AM | −7 | +1 |
| US | CA | 1 | 310 | 804 | 09:42 AM | −8 | +1 |
| FR | BD | 33 | 2 | 559 | 6:42 PM | +1 | +1 |
| IN | BB | 91 | 22 | 742 | 10:42 PM | +5 | — |

Figure 2:
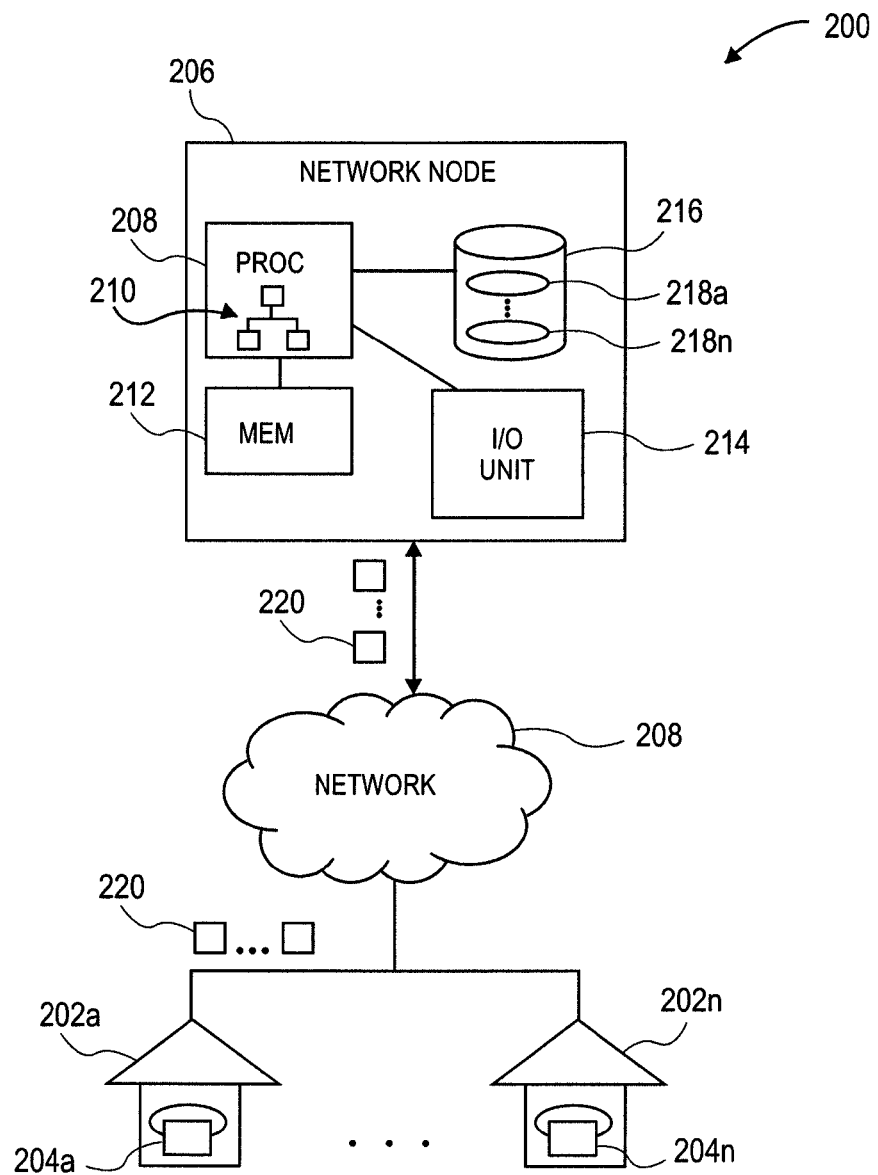
FIG. 2 is an illustration of an illustrative network environment in which telephones may be utilized to present information associated with geographic locations in which called telephones reside.
Figure 3:
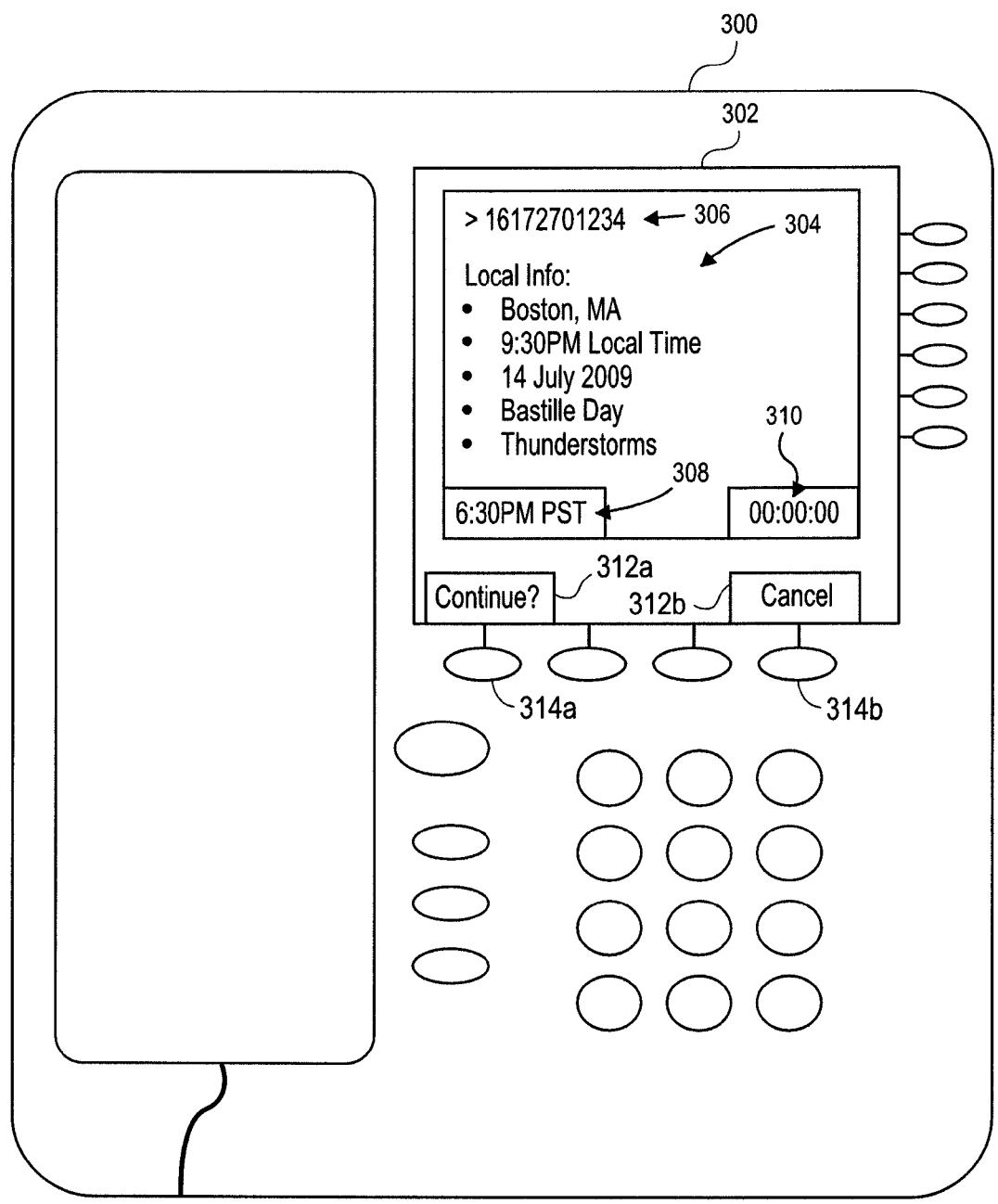
FIG. 3 is an illustration of an illustrative telephone configured to present information associated with a geographic location in which a called telephone resides.

The telephone number identifiers (e.g., area codes) and associated current local times or differential times may be stored in a central computing system, such as a mainframe computing system, and be communicated to communications network nodes throughout the world in one or more communications networks so that callers local to the communications network nodes are able to receive current local times of called parties located within areas that have the telephone number identifiers as part of their telephone numbers, as further described herein with regard to FIGS. 2 and 3. For example, a caller in New York who calls someone in Moscow may, in response to placing the call request, receive a notification either via text or audio (e.g., synthesized voice) of the current local time and/or other information in Moscow.

With regard to FIG. 2, and illustrative network environment 200 includes customers 202a-202n (collectively 202) that utilized telephones 204a-204n (collectively 204), respectively. The telephones 204 may be configured to access a communications network node 206 via a communications network 208.

The communications network node 206 may be configured with a processing unit 208 that execute software 210. The processing unit 208 may further be in communication with (i) memory 212 that is configured to store data and software, (ii) input/output unit 214 that is configured to communicate data over the communications network 208, and (iii) storage unit 216 that is configured to store one or more data repositories 218a-218n (collectively 218). The software 210 may be configured to manage data stored in the data repositories 218 and communicate with the telephones 204 to access and communicate the information stored in the data repositories to the telephones 204. In one embodiment, the information stored in the data repositories 218 is information associated with geographic location as identified by telephone number identifiers (e.g., country code, area code, etc.). The network node 206 may be customer premise equipment that is capable of storing more information than a telephone, and is available to distribute the information to the requesting telephone in response to a request from the telephone. Alternatively, the network node 206 may be a network node on a communications network that is an access point or other network node to which the telephones that are being utilized in a geographically related area are in communication. Still yet, the network node 206 may be a mainframe computer that is centrally located to store information from around the world to other network nodes and/or telephones that may request the information. As understood in the art, the information stored in the data repositories 218 may be requested by the telephones 204 that communicate a request in one or more data packets 220 and, in response, communicate the information to the telephones 204 requesting the information in data packets 220. Any analog or digital communications protocol may be utilized by the telephone 204 to request and receive the information at the telephones 204. In an alternative embodiment, the software 210 may be configured to automatically update by "pushing" updated information from the communications network node 206 to the telephones 204 in response to the information being updated at the communications network node 206.

With regard to FIG. 3, an illustrative telephone 300 is shown to include an electronic display 302 that is displaying a graphical user interface 304. The graphical user interface may display a called telephone number 306 that a user dialed to place a call to another telephone. The telephone 300, in determining that the called telephone number 306 is remote or in a geographic area that is away from the telephone 300 (e.g., in another state, time zone, country, etc.), may be configured to access information local to the called telephone number that is stored on the telephone 300. If the information local to the called telephone number is not stored on the telephone 300, the telephone 300 may be configured to access the information from a communications network node, such as network node 206 (FIG. 2). The information associated with the called telephone number may include city, state, local time, current date, holiday, weather, and any other information local to the geographic location of the called telephone number. As shown, a current time 308 of the time zone in which the telephone 300 resides, in this case Pacific Standard Time in the United States, is shown. In addition, a call connection time 310 may be displayed to show an amount of time that the telephone call is connected to the called telephone. In one embodiment, the telephone 300 may be prevented from connecting to the called telephone for a predetermined time period (e.g., two seconds) to enable the caller to determine whether or not to continue the call should the call be made after a certain time local to the called telephone (e.g., after 6 p.m. and before 8 a.m.).

A "continue?" soft-button 312a and a "cancel" soft-button 312b may be displayed to enable the caller to press hard-button 314a or 314b, respectively, to continue or cancel the call. If the electronic display 302 were a touch-screen, then the user could press one of the soft-buttons 312a or 312b to continue or cancel the call prior to the call being connected to the called telephone. In being connected, a signal may be communicated to the called telephone to cause the called telephone to ring without regard to a recipient or called party answering the telephone call. Although the telephone 300 is shown as a desk-type office telephone, other types of telephones may utilize the principles of the present invention. For example, mobile telephones or wall telephones without electronic displays may utilize the principles of the present invention. In the case of a wall-type telephone without an electronic display being configured to utilize the principles of the present invention, a network node or CPE may be configured with an interactive voice response (IVR) system that provides the same or similar functionality as described herein with regard to a telephone.

Figure 4:
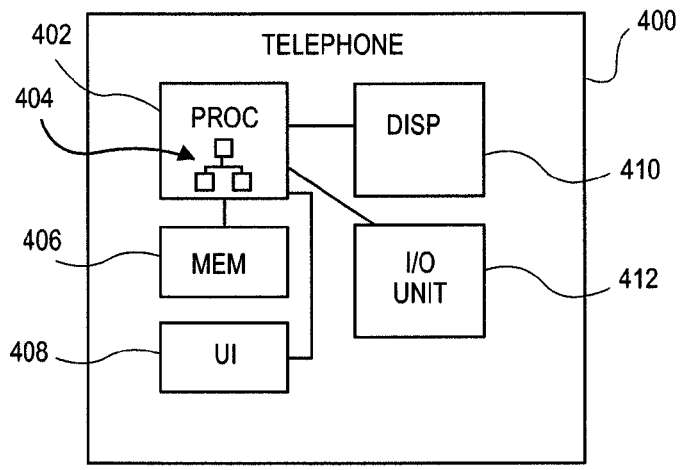
FIG. 4 is a block diagram of an illustrative telephone configured to store and display information associated with geographic locations in which called telephones reside.

With regard to FIG. 4, a block diagram of an illustrative telephone 400 is shown to include a processing unit 402 that executes software 404. The processing unit 402 may be in communication with a memory 406 that is configured to stored data and/or software, user interface (UI) 408 that may include hard-buttons or any other user interface components typically used on a telephone, as understood in the art, electronic display 410 that may be a conventional electronic display or touch-screen electronic display, and input/output (I/O) unit 412 that may provide transceiver functionality for the telephone 400 to communicate over a communications network, such as a public switched telephone network (PSTN), voice over internet protocol (VoIP) network, the Internet, mobile communications network, or any other communications that work, as understood in the art. The software 404 may be configured to store a contact list (FIG. 6) and information local to a telephone number identifier (e.g., area code) of each telephone number stored in the contact list. The software 404 may further be configured to access remotely stored information of different geographic regions or locations. Still yet, the software 404 may be configured to receive information from a communications network that identifies a geographic location in which a mobile telephone currently resides and download the information associated with the geographic location of the mobile telephone for storage and presentation to a caller. In determining a current geographic location in which a mobile telephone currently resides, a variety of techniques may be utilized, including receiving an area code in the geographic location from a communications network node that converts geographic coordinates, such as Global Positioning System (GPS) coordinates, into area code, for example. In one embodiment, the software 404 may be configured to request or prompt from the caller an answer as to whether he or she would like to place the call should the call be placed to a called location after a predetermined time and before another predetermined time (e.g., after 8 p.m. and before 8 a.m.).

Figure 5:
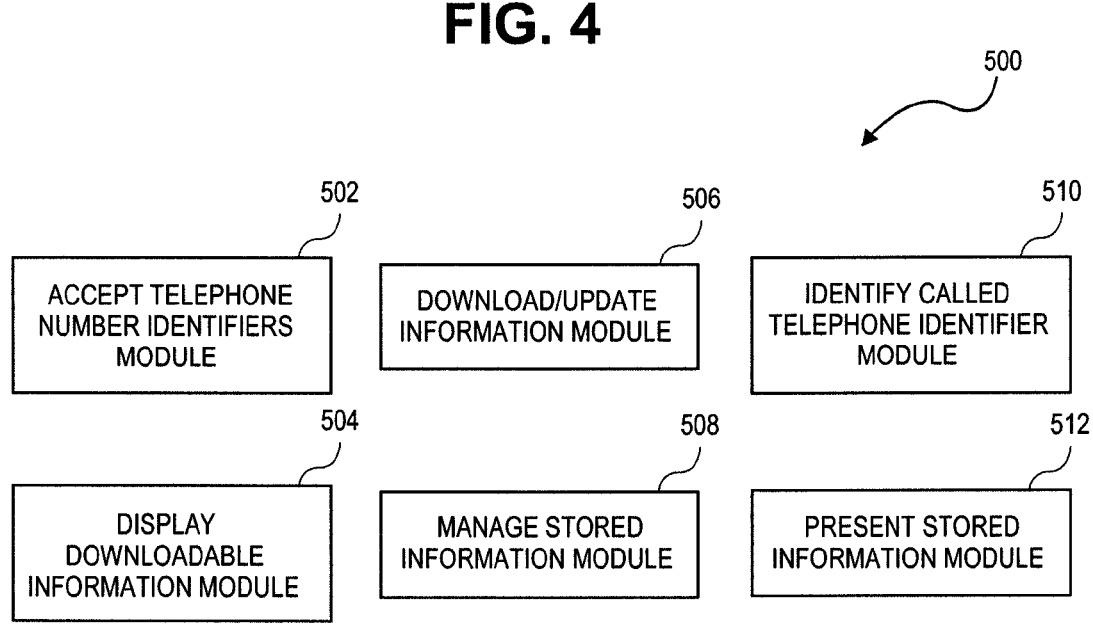
FIG. 5 is a block diagram of software modules configured to operate on the telephone of FIG. 4.

With regard to FIG. 5, software modules 500 may include a number of different software modules that may be configured to provide for the principles of the present invention when executed by a processing unit of a telephone, such as telephone 400 of FIG. 4. The modules 500 may include and accept telephone number identifiers module 502 that enables a user to enter a telephone number identifier, (e.g., country code, area code, city code, exchange code, or otherwise) to either display information stored on the telephone or remotely access information associated with a geographic location associated with the telephone number identifier entered by the user.

A display downloadable information module 504 may be configured to access information remotely located from the telephone and display the information to enable a user to download the information for storage on the telephone. The display downloadable information module 504 may be accessible via an icon or text in a directory, menu, or other graphical user interface, and be configured to present the downloadable information in a hierarchical format, such as by continent, country, state, region, city, or otherwise, such that a user may selectively parse through the information to locate the information he or she desires to download. For example, in the case of a user wanting to download information to the telephone located in England, the user would enter a country code of England, and further be able to select or otherwise enter an area code in a region of England that he or she desires to download local information. In one embodiment, the user may be prompted to "enter a telephone number for which to view downloadable location information." As previously described, local information may include holidays and emergency situations or events, for example. Alternatively, the display downloadable information module 504 may be configured to enable a user to select continent, such as Europe, then country, such as England, then region or city, such as Liverpool. In one embodiment, rather than enabling the user of the telephone to access every town in a country, major cities or countries may be presented to enable the user to select a particular time zone in which the telephone number to which he or she may call is located. In addition to downloading the information, one or more area codes may be downloaded to associate with the information.

A download/update information module 506 may be configured to download or update information from a communications network node via a communications network. The download/update information module 506 may operate in response to a user requesting to download information used in the display downloadable information module 504, in response to the user dialing a telephone number either via memory request (e.g., selection of a name or telephone number in a contact list), during a conference call, or any other call by dialing or otherwise placing a call to a telephone number. The download/update information module 506 may further be configured to update information stored in a memory on the telephone on a periodic basis or in response to an event (e.g., caller placing a telephone call to a telephone number having a telephone number identifier). The download/update information module 506 may operate while maintaining the telephone in an off-hook mode using a digital subscriber line (DSL) or other communications network and protocol, thereby enabling the telephone to be utilized to receive or place calls while downloading or updating the information. In one embodiment, the download/update information module 506 may be configured to check for updates on a periodic basis, in response to an event, such as a user pressing a button, placing the telephone in an off-hook state, turning on a handset, receiving a call, or otherwise. The user may also associate "do not disturb" timeslots with respect to the downloaded information that may be used to alert the user to not call or re-think calling someone in that geographic area during those timeslots.

A managed stored information module 508 may be configured to manage information that is being stored in a memory of the telephone. The managed stored information module 508 may be configured to add information in response to a user adding a telephone number to a contact list, dialing a telephone number in which the telephone number is maintained in a call history list, or delete a telephone number from a contact list or call history list. For example, if a caller has a telephone number stored in a contact list or call history list that has a telephone number identifier that indicates Boston (e.g., area code 617), if the telephone number is deleted from a contact list or call history list that no other telephone numbers are in the contact list or call history list that have that same or matching (i.e., the same or different area code, for example, in the same or overlapping geographic location) telephone number identifier, then the managed stored information module 508 may delete information associated with that telephone number identifier (i.e., any information associated with Boston).

An identify called telephone identifier module 510 may be configured to identify telephone number identifier(s) that are called when a user places a call. For example, the identify called telephone identifier module 510 may determine country code, area code, exchange code, or otherwise to determine a telephone number identifier that may be utilized to identify information that is stored in the telephone or may be remotely accessed by the telephone from a communications network node for presentation to a user. In one embodiment, if the caller calls a mobile telephone or other handset, the identify called telephone identifier module 510 may be configured to receive a telephone number identifier from a network node (e.g., mobile switching center (MSC)) currently servicing the mobile telephone.

A present stored information module 512 may be configured to present information that is stored in the telephone to a user on an electronic display or otherwise utilizing a synthesized voice that reads the information to the caller. The present stored information module 512 may be in communication with an IVR (not shown) that enables a user to responsively interact with the telephone to cause or prevent a telephone call from being connected to a called party such that the caller has the ability to stop a telephone call that is being placed to a called party that is currently in a time zone that is late at night or any other time during the day that the caller may not wish to disturb the called party. In addition, the present stored information module 512 may be configured to store holidays, both national and local, and emergency event information local to the called party, such that in the event that the caller is unable to reach the called party, that the caller may at least know why there may be a problem. In one embodiment, a set of emergency event codes (e.g., 2 digits) may be stored on the telephone and be used to display associated words indicating the emergency events when an emergency event code is downloaded in association with a geographic location and a call is placed to that geographic location.

With regard to FIG. 6, a table showing an illustrative contact list 600 is shown to include a name field 602, telephone number field 604, and birthday field 606. In one embodiment, the contact list 600 may include only a name field 602 and telephone number field 604. It should be understood that other data fields, such as address, e-mail address, and other information associated with people in the contact list 600 may be stored in the contact list 600. The telephone number field 604 may include telephone numbers of different people with whom a user maintains contact. As shown, each telephone number in the telephone number fields 604 include an area code (e.g., "617") and exchange code (e.g., "270"). If the contact has telephone numbers that were in countries other than the United States and Canada, the telephone numbers would include a country code and possibly other codes that designate a particular country and regions as understood in the art. The codes, including the area code and/or exchange code, may be designated as telephone number identifiers that the telephone uses to access information from a communications network node on a communications network to download and store the information on the telephone for use when the caller places a call to the associated contact. The stored information may also be presented to a caller in response to calls being placed in the same geographic area by identifying the telephone number identifier when placing a call. In one embodiment, the telephone may determine that the current date matches a date in the birthday field 606 of a contact that the caller is attempting to contact and display "birthday" on an electronic display. In an alternative embodiment, the telephone may display the words "contact birthday" on an electronic display so that a user may see that someone in his or her contact list is having a birthday, thereby reminding the user to call the contact person on his or her birthday.

As understood in the art, multiple area codes may overlap in a geographic location. As such, the software, such as the identify called telephone identifier module 510, may determine that the telephone number identifier that is in the same or overlapping geographic area is a match to that of another telephone number identifier even though the telephone number identifiers are not identical. For example, the Boston region has various area codes that are used, including "617" and "781." If the identify called telephone identifier module 510 determines that the caller places a call to a telephone number having area code "781," then the identify called telephone identifier module 510 may indicate that the call to the telephone number is a match to the geographic location of area code "617" and access and display information associated with the telephone number identifier "617" so that the caller may view or listen to the information, which may include current local time at the called telephone number, emergency event information, and holiday information.

With regard to FIG. 7, a table of illustrative information 700 of geographic locations associated with telephone number identifiers that are contained within the contact list 600 of FIG. 6. The information 700 may include country, state, city, country code, area code, GMT offset, daylight savings time (DST) offset, holidays, and emergency information. Because telephones typically do not have a large memory, the information stored in the telephone may be that of geographic locations of contacts with the same telephone number identifiers (e.g., area codes), call history list (both incoming and outgoing), and those that have been called within a given time period (e.g., within the past month). As shown the emergency information for the city of Fargo, N. Dak. is shown as a flood, which may assist a caller in knowing why a called party is not answering his or her telephone. In one embodiment, the information 700 may include records with multiple area codes that are a match for the same geographic location or region if the area codes are generally utilized in overlapping regions.

Figure 8:
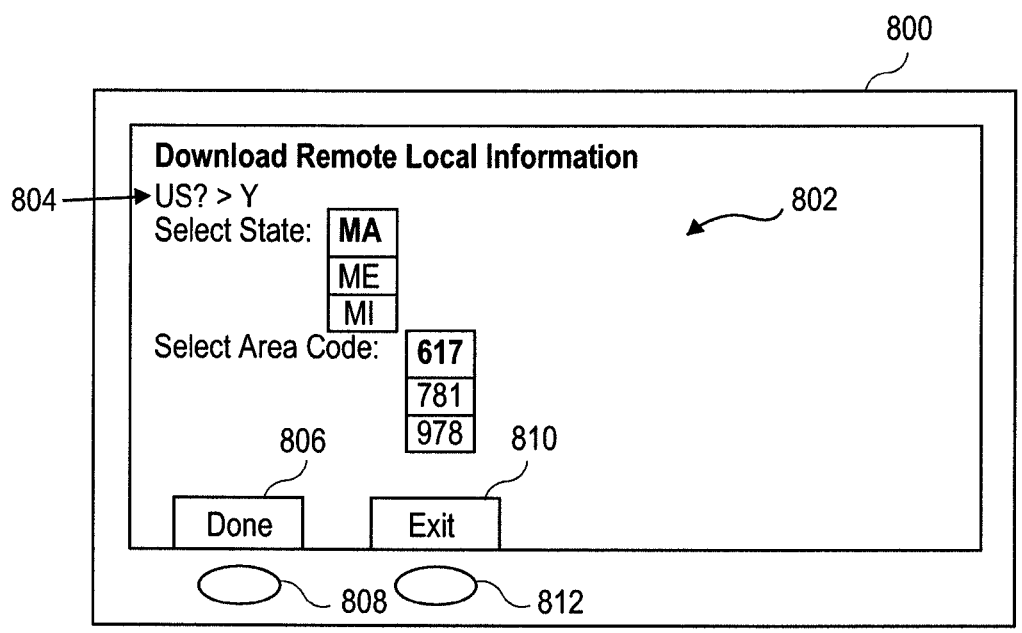
FIG. 8 is an illustration of an illustrative graphical user interface displayed on a telephone.

With regard to FIG. 8, an illustrative electronic display 800 showing an illustrative graphical user interface 802 is shown. The graphical user interface 802 is one that includes information that is accessible from a network node that includes information of geographic locations associated with telephone number identifiers from around the world. A user of a telephone with the electronic display 800 may be visually prompted with an initial question 804 as to whether the user is searching for information that is located in the United States or outside of the United States. If the user enters a "Y" then the user is prompted with a selectable list or pull-down menu to select a state (e.g., "MA," "ME," "MI," etc.), such that the user may select the state. After selecting the state, the user may be prompted with a list of selectable area codes contained within the state. Other selectable information that a user may be able to focus or select information for downloading to the telephone may be presented to the user. Other information, such as holiday and emergency events may be selected so that the telephone collects and stores that information in the telephone. If the telephone is configured to download emergency event information, then the telephone may automatically pull emergency event information from a network node or, alternatively, the network node may be configured to automatically push emergency event information as emergency event information is updated on the network node. If the user is done with selecting remote geographic location information to be updated or accessed in the telephone, then the user may select a soft-button 806, if the electronic display 800 is a touch-screen display, or hard-button 808, which is associated with the soft-button 806. Otherwise, the user may select soft-button 810 or hard-button 812, which is associated with soft-button 810 to exit the graphical user interface.

With regard to FIG. 9, a flow chart of an illustrative process 900 for a telephone to make available local geographic information at a called party location is provided. The process 900 starts at step 902, where information and telephone number identifiers associated with remote geographic locations are stored. The storage of the information and telephone number identifiers may be stored in a relationship such that one or more telephone number identifiers (e.g., area codes) are stored with related information so that the information may be accessed by simply looking up the telephone number identifier in a table, for example. At step 904, in response to a telephone number being dialed, a determination may be made as to whether a portion of the dialed telephone number matches a stored telephone number identifier. The portion of the dialed telephone number may be an area code or a combination of an area code and an exchange code, for example. In determining whether a telephone number matches a stored telephone number identifier, an exact match may be made or a telephone number identifier that overlaps with the portion of the telephone number in a geographical manner (e.g., "617" and "781" in the Boston region is considered a match).

At step 906, the match determination may be made. If it is determined that the portion of the dialed telephone number matches a stored telephone number identifier, then the process continues at step 908 where at least a portion of the information associated with the matched telephone number identifier is presented to the user. In one embodiment, the presentation may be made using a synthesized voice audible signal. Alternatively, the presentation may be made with a text or other graphical display on an electronic display. If it is determined at step 906 that a match did not occur with the portion of the dialed telephone number and a stored telephone number identifier, then the process continues at step 910 where information associated with a portion of the dialed telephone number may be requested from a communications network node (e.g., CPE, private branch exchange (PBX), or switch) and the information is presented to the user.

With regard to FIG. 10, a flow chart of an illustrative process 1000 for a telephone to manage information associated with telephone number identifiers is shown. The process 1000 starts at step 1002, where information and telephone number identifiers associated with remote geographic locations is stored. In one embodiment, the information is stored in a hierarchical manner. Alternatively, the information may be stored in a relational manner, as understood in the art. At step 1004, a stored telephone number may be deleted from a contact list or call history list, for example. At step 1006, a determination may be made as to whether any other stored telephone numbers exist with the telephone number identifier of the deleted stored telephone number. If not, then the stored information associated with the telephone number identifier may be deleted. Otherwise, if other stored telephone numbers with the telephone number identifier that was deleted at step 1004 may cause the telephone to maintain the information, such that the process ends at step 1010. The process 1000 may be utilized to minimize the amount of information stored in the telephone, thereby maintaining fast operations for accessing the information of geographic locations that a user may call around the world.

While the principles of the present invention provide for obtaining, managing, and utilizing information of geographic locations that are associated with telephone number identifiers from around the world, the telephone that stores the information may be configured to ignore certain telephone numbers that are dialed from the telephone to expedite the calls as the calls are clearly not being placed to called parties that the caller would be concerned about information at those geographic locations of the called parties. For example, calls places within the same area code as the telephone, calls placed within the same geographic region as the telephone, calls placed to "411," emergency calls placed to "911," or other telephone numbers that the caller would have no interest in knowing information associated with the locate geographic location of the telephone. It should further be understood that while the telephone may be configured to provide information associated with telephone number identifiers, the telephone may further be configured to enable a user to disable or limit the information feature to calls placed only to other countries or other time zones, for example. Still yet, the telephone may be configured to limit providing the information to only those telephone numbers that are stored in memory, such as in a contact list.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A communication device for providing information local to a called party located in a different geographic location, said communication device comprising:
  a memory configured to store information associated with remote geographic locations;

an input/output unit configured to communicate over a communications network to download the information from a network node;

a processing unit in communication with said memory and input/output unit, and configured to execute instructions for performing operations comprising:

sending a request to a network device to determine a current location of a second communication device associated with an entered communication identifier, receiving location information identifying the current location of the communication device associated with the entered communication identifier; and presenting at least a portion of the information corresponding to the current location of the communication device associated with the entered communication identifier.

2. The communication device according to claim 1, further comprising an electronic display configured to display the information.

3. The communication device according to claim 2, wherein the operations further comprises accessing, on a communications network node, information associated with a user-entered telephone number identifier.

4. The communication device according to claim 1, wherein the operations further comprises bypassing the sending, receiving, and presenting steps in response to a determination that the entered communication identifier is "911".

5. The communication device according to claim 1, wherein the operations further comprises storing the information associated with the remote geographic locations in said memory for presentation to a user.

6. The communication device according to claim 5, wherein the operations further comprises updating the information in said memory on a periodic basis while the communication device is not in use.

7. The communication device according to claim 6, wherein the operations further comprises deleting from said memory the information corresponding to a geographic location that has not been called the longest in response to a shortage of memory storage space.

8. A computer implemented method performed on a communication device for providing information local to a called party located in a different geographic location, said computer implemented method comprising:

receiving, at the communication device, a communication identifier;

sending a request to a network device to determine a current location of a second communication device associated with the communication identifier, receiving location information identifying the current location of the communication device associated with the communication identifier; and presenting at least a portion of the information corresponding to the current location of the communication device associated with the communication identifier.

9. The computer implemented method according to claim 8 further comprising accessing, on a communications network node, information associated with a user-entered telephone number identifier.

10. The computer implemented method according to claim 8 further comprising bypassing the sending, receiving, and presenting steps in response to a determination that the communication identifier is "911".

11. The computer implemented method according to claim 8 further comprising storing the information associated with remote geographic locations in local memory of the communication device for presentation to a user.

12. The computer implemented method according to claim 11 further comprising updating the information in the local memory of the communication device on a periodic basis while the communication device is not in use.

13. The computer implemented method according to claim 12 further comprising deleting from the local memory of the communication device the information corresponding to a geographic location that has not been called the longest in response to a shortage of memory storage space.

14. A non-transitory computer readable medium comprising computer executable instructions for providing information local to a called party located in a different geographic location, the computer executable instructions when executed causes one or more machines to perform operations comprising:

receiving, at a first communication device, a communication identifier;

sending a request to a network device to determine a current location of a second communication device associated with the communication identifier, receiving location information identifying the current location of the second communication device associated with the communication identifier; and presenting at least a portion of the information corresponding to the current location of the second communication device associated with the communication identifier to a user of the first communication device.

15. The non-transitory computer readable medium according to claim 14 wherein the operations further comprises accessing, on a communications network node, information associated with a user-entered telephone number identifier.

16. The non-transitory computer readable medium according to claim 14 wherein the operations further comprises bypassing the sending, receiving, and presenting steps in response to a determination that the communication identifier is "911".

17. The non-transitory computer readable medium according to claim 14 wherein the operations further comprises storing the information associated with remote geographic locations in local memory of the first communication device for presentation to the user.

18. The non-transitory computer readable medium according to claim 17 wherein the operations further comprises updating the information in the local memory of the first communication device on a periodic basis while the first communication device is not in use.

19. The non-transitory computer readable medium according to claim 18 wherein the operations further comprises deleting from the local memory of the first communication device the information corresponding to a geographic location that has not been called the longest in response to a shortage of memory storage space.

* * * * *